Aug. 31, 1965　　　G. E. BRYNN ETAL　　　3,203,729
CONVERTIBLE TOP
Filed July 19, 1963　　　　　　　　　　　　　　2 Sheets-Sheet 1

INVENTORS
Gerald E. Brynn &
BY Gerald R. Mahoney
Edward E. James
ATTORNEY

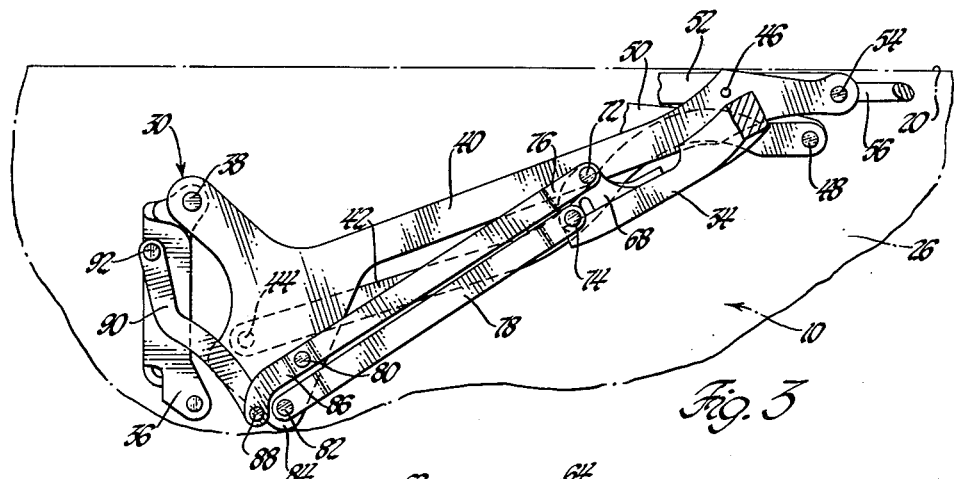
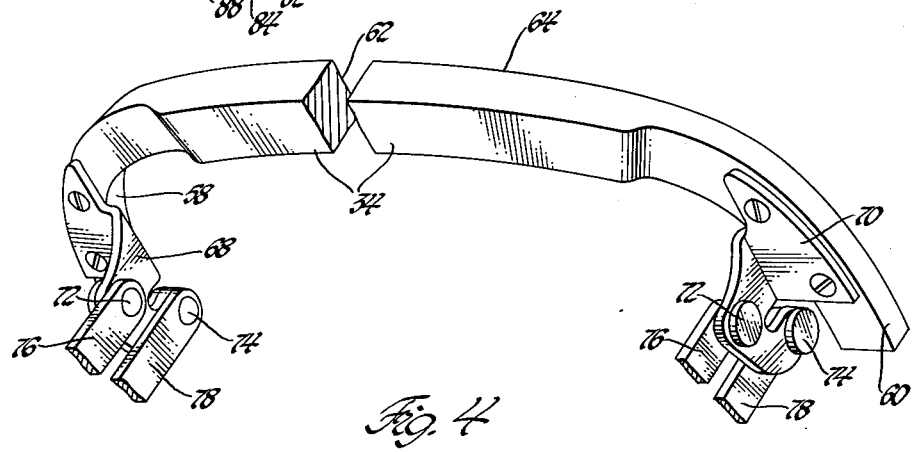
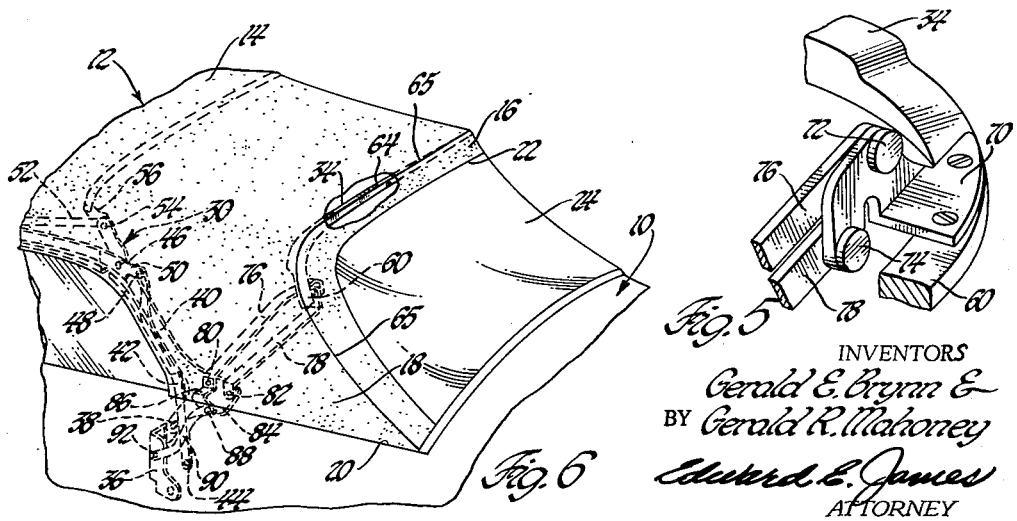
INVENTORS
Gerald E. Brynn &
BY Gerald R. Mahoney
Edward E. James
ATTORNEY United States Patent Office 3,203,729
Patented Aug. 31, 1965

3,203,729
CONVERTIBLE TOP
Gerald E. Brynn, Farmington, and Gerald R. Mahoney, Grosse Pointe Farms, Mich., assignors to General Motors Corporation, Detroit, Mich., a corporation of Delaware
Filed July 19, 1963, Ser. No. 296,261
10 Claims. (Cl. 296—107)

This invention relates to a convertible top for a vehicle body and more particularly to a convertible top rear bow and actuating means therefor.

The invention broadly contemplates a convertible top having a transverse rear bow mounted for movement between a top-opened retracted position and a raised top-closed operative position wherein the rear bow member smoothly and evenly tenses the top fabric to form and support an upper rear corner of desired transverse roof curvature and downwardly inclined side rear corners in the raised top.

As incorporated in an illustrative embodiment disclosed herein, the invention further contemplates and features a rear bow member mounted by transversely spaced quadrilateral linkages operably connected for controlled bow swinging movement with corresponding actuating movement of a primary top supporting frame linkage between a bow retracted position nested transversely of the folded primary frame linkage and a rotated top-closed operative position wherein the raised rear bow member is rearwardly and downwardly inclined with respect to the body and smoothly and evenly tenses the top fabric forwardly and downwardly of rear corners formed by the bow in the raised top. The illustrative rear bow frames the upper transverse and side edges of a rear window opening provided in the rear portion of the top and further serves to initiate proper folding of a flexible rear window and of the rear and side corner portions of the top during movement of the top and frame to their retracted top-opened positions.

The foregoing and other objects, advantages and features of the invention will be apparent from the following description of the illustrative embodiment having reference to the accompanying drawings, in which:

FIGURE 3 is a view similar to FIGURE 2 showing the rear bow and its supporting linkage in their retracted top-opened positions;

FIGURE 4 is a fragmentary perspective view showing opposite ends of the rear bow and the pivotal connections of their supporting links in their raised top supporting positions;

FIGURE 5 is a view similar to FIGURE 4 but showing only one end of the bow member in its retracted position relative to its supporting links; and FIGURE 6 is a fragmentary perspective view showing the top and rear bow supporting linkage in their raised top-closed positions.

Figures 1, 2:
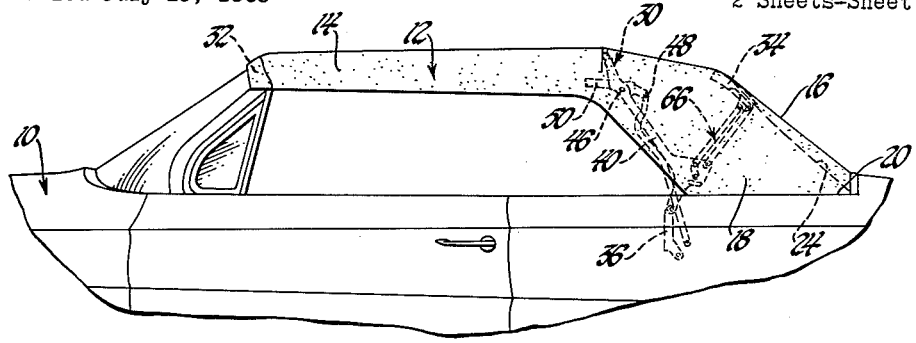
FIGURE 1 is a fragmentary side elevational view of the upper portion of a convertible vehicle body and shows the top and rear bow structure of the invention in their raised top-closed positions.
FIGURE 2 is an enlarged fragmentary view similar to a portion of FIGURE 1 but sectioned to show the rear bow and the quadrilateral linkage supporting one end thereof in their raised top-closed operative positions in relation to the raised top and body both shown in broken phantom lines.

Referring more particularly to FIGURE 1, a convertible vehicle body 10 is provided with a foldable fabric top 12 shown in its raised or closed position. The raised top comprises a forwardly extending roof portion 14 and a downwardly inclined rear roof portion 16 including two opposite rear and side corner portions 18. The opposing inner edges of these corner portions cooperate with the rear edge of the upper roof portion and the vehicle body belt line 20 to define a rear window opening 22. A foldable flexible plastic window 24 may be removably mounted in a conventional manner to close the rear window opening. The lower ends of the side portions are preferably secured to the body below the belt line within a shallow top stowing compartment 26 extending transversely and rearwardly of the vehicle passenger compartment above rear wheel housings outlined in broken phantom lines at 28 in FIGURES 2 and 3. Contour-conforming engagement between the body belt line and the raised top is preferably effected by a top or linkage actuated bite bow, not shown, adapted to carry the side corner portions and rear window into sealing abutment with the underside of the belt line molding.

In its raised position, the roof portion 14 is extended forwardly and tensively maintained by a foldable top supporting frame linkage partially shown at 30 between a front rail 32 engageable with the windshield mounting header of the body and a rear bow 34. In accordance with the invention, the rear bow is mounted to assume a rearwardly and downwardly inclined raised operative position. The top supporting frame linkage 30 is foldable from its extended, top-closing raised position shown in FIGURES 1 and 2 to a retracted or lowered top-opened folded position, shown in FIGURE 3, substantially contained within the top stowing compartment 26. Since the primary or forwardly extending portions of the top supporting frame linkage may be of any suitable conventional design, such as that shown and described in United States Patent No. 3,030,140 issued to Delbert C. Probst and entitled "Convertible Top," only those elements of the primary top supporting linkage relating to the mounting and actuation of the rear bow 34 are herein shown and described.

Two brackets 36 are suitably mounted on opposite sides of the vehicle within the compartment 26. Each bracket pivotally mounts a rear side rail section or member 40 of the top supporting frame for swinging movement about a fixed axis 38. A rear motion controlling link 42 is also pivotally mounted on each side of the vehicle body for swinging movement about a fixed axis 44 parallel to and spaced slightly below and to the rear of the side rail mounting pivot 38 of the adjacent bracket. As shown in FIGURE 2, the distal swinging end of each side rail 40 and control link 42 is pivotally connected at 46 and 48, respectively, in slightly spaced parallel relation to the rearward end of a second side rail member 50 swingable thereby between a forwardly extending raised position and a folded retracted position. A second control link 52 is pivotally connected at 54 to the upper end of each rear side rail member 40. The control links 52 support opposite ends of a transverse top supporting bow 56 and extend forwardly to control folding movement of the forward frame elements, not shown.

As best seen in FIGURES 2 and 4, the rear bow 34 is curved transversely of the vehicle body to provide the rear contour desired in the raised fabric top. The intermediate bight portion and the depending opposite end portions 58 and 60 of the resulting bow have a common surface 62 of relatively flat, smooth shallow curvature transversely of the vehicle. The upper window opening defining edges of the fabric top are suitably secured to this relatively flat bow surface. The bow member thus rigidly frames the upper portion of the window opening. In the raised operative position of the bow, the fabric engaging surface 62 is inclined rearwardly and downwardly and cooperates with an upper corner edge 64 on the bow to corner the raised fabric top to define the desired transverse rear roof curvature and to initiate the formation of relatively sharp rear side corner edges 65 extending rearwardly and downwardly from the bow end portions 58 and 60 to the body belt line 20.

In the illustrative embodiment, the bow member is mounted for controlled swinging and rotational movement between its raised operative position and its lowered retracted position by suitable quadrilateral linkages 66. These linkages include flanged brackets 68 and 70 secured to opposite ends of the bow member. These brackets each have closely spaced pivotal connections at 72 and 74 with the adjacent ends of two relatively long, substantially parallel links 76 and 78. These paired links extend forwardly and downwardly throughout their normal range of swinging movement and are pivotally connected in closely spaced relation adjacent their forward distal ends at 80 and 82, respectively, on a projecting arm or extension 84 formed on each side rail member 40 adjacent its pivotal mounting on its body supported bracket 36. An operating arm 86 on the forward end of each bow supporting link 76 is pivotally connected at 88 to one end of a motion controlling tie link 90. The distal end of each tie link 90 is pivotally mounted at 92 on the adjacent body mounted bracket 36.

The geometry of the bow supporting linkages is such that swinging movement of the rear side rail members 40 in a clockwise direction from their raised positions shown in FIGURE 2 causes the tie links 90 to rotate the bow supporting links 76 and 78 in a counterclockwise direction with respect to their pivotal connections. During initial top opening movement of the rear side rail members, the resultant compound motion imparted to the bow supporting links serves to swing the rear bow member 34 downwardly with only slight rotation relative to the vehicle body until an inclined intermediate bow position is reached, shown in broken lines in FIGURE 2. This initial movement of the bow member serves to initiate proper folding of the rear corner portions of the top and of the flexible rear window rearwardly and downwardly into the top stowing compartment 26. Beyond the inclined intermediate bow position shown, the rotation imparted to the bow supporting links by the tie links during further top opening movement of the rear side rail members serves to rapidly rotate the bow member rearwardly and downwardly in a clockwise direction to a fully retracted position shown in FIGURE 3. In this retracted position, the rear bow is nested transversely of the retracted top supporting linkage within the top stowing compartment 26. This controlled rotation of rear bow to its fully retracted position further serves to suitably fold the flexible window and fabric top adjacent thereto.

From the foregoing, it will be seen that the illustrative rear bow member rigidly frames the upper portions of the rear window opening in a convertible top and is capable of smoothly cornering the fabric top in its raised operative position and of evenly tensing the top fabric extending forwardly, rearwardly and downwardly therefrom. It will be further apparent that various changes and departures might be made in and from the disclosed illustrative embodiment without departing from the spirit and scope of the invention as defined in the following claims.

We claim:

1. In combination with a convertible vehicle body, a top supporting frame mounted on said body for movement between raised and lowered positions, a rear bow member curved transversely of said body, a linkage means, said linkage means mounting said bow member on said frame for positive movement between a folded lowered position and a raised operative position wherein said bow member is downwardly inclined rearwardly of said body and supports a transverse rear upper edge of the top and adjacent upper rear side edge portions of the top spacedly of a top defined rear window opening.

2. In combination with a convertible vehicle body, a foldable top, a top supporting frame mounted on said body for movement between raised and lowered positions, a rear bow member, means mounting said bow member transversely of said body for positive movement with said top supporting frame between a lowered position and a raised top tensing position wherein said bow member is rearwardly and downwardly inclined toward said body and forms a transverse rear upper corner and rearwardly and downwardly inclined rear side corner edges in the raised top.

3. In the combination set forth in claim 2, said top having a rear window opening therein and said bow member being secured to said top and spacedly framing the upper transverse and side edges of said window opening.

4. In a convertible vehicle having a fabric top supported by a frame foldable between an extended top-closed position and a retracted top-opened position, said fabric top having a transverse rear panel portion inclined rearwardly and downwardly of the body in its raised top-closed position and forming relatively sharp-edged corners with forwardly extending roof and rear quarter side panel portions of the top fabric, a rear bow member, linkage means supporting said bow member transversely of the vehicle for swinging movement relative to said frame, and means for swinging said bow member in accordance with corresponding movement imparted to said frame between a retracted position and a rearwardly and downwardly inclined extended position smoothly and evenly tensing the rear panel portion and the top fabric forwardly and downwardly of the bow member to form and support a transverse upper rear corner edge and downwardly and rearwardly extending rear corner side edges of the closed fabric top.

5. In combination with a convertible vehicle body, a fabric top having a forwardly extending roof portion and a rearwardly and downwardly inclined rear portion secured to the vehicle body, a top supporting frame foldable between a top-closed raised position and a retracted top-opened position, a transverse rear bow member, linkage means supporting said bow member for controlled swinging movement in accordance with corresponding movement of the top supporting frame between a retracted position and a raised position inclined rearwardly and downwardly toward the vehicle body, said bow member being curved upwardly intermediate its ends and having a relatively flat rear face in its raised position smoothly cornering and tending to evenly tense the fabric of the closed top forwardly, rearwardly and downwardly from the bow member to provide the desired transverse rear roof curvature and forming relatively sharp rear corner edges extending rearwardly and downwardly of the raised top to the vehicle body.

6. In the combination set forth in claim 5, the rear portion of said top having a rear window opening therein, and the rear face of said bow member being secured to said top in spaced relation to the upper portion of said rear window opening.

7. In combination with a convertible vehicle body having a foldable top including a forwardly extending roof portion and rear corner portions secured to the vehicle body and defining a rear window opening therebetween, a top supporting frame linkage foldable between an extended top-closed position and a top-opened position retracted within the vehicle body, a transverse rear bow member secured to the foldable top and spacedly framing the upper portion of the rear window opening and adapted to form relatively sharp rear corner edges extending downwardly and rearwardly of the raised top toward the vehicle body, linkage means supporting the bow member for controlled rotation and swinging movement relative to the top supporting frame, and means operable to swing said quadrilateral linkage means in accordance with top opening and closing movement imparted to the frame so as to rotate the bow member between a retracted position nested transversely of the retracted frame and an extended position wherein the bow member frames the upper rear window opening and supports the upper transverse and downwardly and rearwardly inclined rear corners of the foldable top thereby evenly tensing the top material forwardly and downwardly of said bow member.

8. In combination with a convertible vehicle body, a foldable top having a forwardly extending roof portion and downwardly inclined rear corner side portions secured to the vehicle body and defining a rear window opening therebetween, a primary top supporting frame linkage foldable between an extended top-closed position and a substantially flat top-opened position retracted within the vehicle body, a top supporting rear bow member curved transversely of the vehicle body, quadrilateral linkage means supporting the opposite ends of said bow member for controlled swinging movement relative to the primary top supporting frame, and means operably connected to swing said quadrilateral linkage means so as to rotate said bow member in accordance with corresponding top opening and closing movement imparted to said primary frame between a rearwardly rotated retracted position nested transversely of the retracted primary frame and an extended position wherein said bow member is inclined rearwardly and downwardly toward the vehicle body and spacedly supports the upper transverse and downwardly inclined rear window opening defining edges of the foldable top and smoothly corners and evenly tenses the top material forwardly and downwardly of said bow member.

9. In combination with a vehicle body having a foldable convertible top carried by a folding top supporting frame between an extended top-closed position and a top-opened position retracted within the vehicle body, said top having a forwardly extending roof portion and a downwardly and rearwardly inclined rear portion secured to the vehicle body, a curved transversely extending rear bow member, quadrilateral linkage means supporting said bow member for swinging movement relative to the frame, and means associated with said quadrilateral linkage means and operable in accordance with corresponding movement imparted to said frame between its extreme positions to rotate said bow member between a retracted position nested transversely of the retracted frame and an extended position inclined rearwardly and downwardly toward the body, said bow in its inclined extended position defining and supporting an upper transverse rear corner and downwardly inclined rear corners in the foldable top and smoothly tensing the top material forwardly, rearwardly and downwardly from said bow member.

10. In a convertible vehicle body having a fabric top supported by a foldable frame linkage for movement between an extended top-closed position and a retracted top-opened position, a rear bow member curved transversely of the vehicle body, linkage means supporting said bow member for swinging movement relative to the top supporting frame between a retracted position and an extended raised position inclined rearwardly and downwardly toward the body, and means for controlling the swinging movement of said bow member between its extreme positions in accordance with corresponding movement imparted to the remainder of said frame, said bow being maintained in its extended position by said linkage and movement controlling means in fabric tensing engagement throughout its length and defining a transversely curved upper rear corner edge and forming downwardly and rearwardly inclined opposite rear side corner edges in the fabric top thereby evenly tensing the top fabric forwardly and downwardly of the bow member.

References Cited by the Examiner
UNITED STATES PATENTS 2,055,889    9/36    Ball _____ 296—107
3,030,140    4/62    Probst _____ 296—107

A. HARRY LEVY, *Primary Examiner.*